United States Patent
Campbell

(10) Patent No.: US 10,083,453 B2
(45) Date of Patent: Sep. 25, 2018

(54) METHODS, SYSTEMS, AND COMPUTER READABLE MEDIA FOR TRACKING CONSUMER INTERACTIONS WITH PRODUCTS USING MODULAR SENSOR UNITS

(71) Applicant: Triangle Strategy Group, LLC, Raleigh, NC (US)

(72) Inventor: Patrick Joseph Campbell, Raleigh, NC (US)

(73) Assignee: TRIANGLE STRATEGY GROUP, LLC, Raleigh, NC (US)

( * ) Notice: Subject to any disclaimer, the term of this patent is extended or adjusted under 35 U.S.C. 154(b) by 752 days.

(21) Appl. No.: 14/145,649

(22) Filed: Dec. 31, 2013

(65) Prior Publication Data

US 2014/0114708 A1     Apr. 24, 2014

Related U.S. Application Data

(63) Continuation-in-part of application No. 13/422,736, filed on Mar. 16, 2012, now Pat. No. 9,727,838.
(Continued)

(51) Int. Cl.
*G06Q 30/02* (2012.01)
*G08B 5/22* (2006.01)

(52) U.S. Cl.
CPC .......... *G06Q 30/0201* (2013.01); *G08B 5/22* (2013.01)

(58) Field of Classification Search
None
See application file for complete search history.

(56) References Cited

U.S. PATENT DOCUMENTS 4,212,361 A * 7/1980 Stocker ................. G01G 23/10
177/200
4,660,160 A * 4/1987 Tajima ............... G01G 19/4144
177/185
(Continued)

FOREIGN PATENT DOCUMENTS

JP      05-135084 A     6/1993
JP      05/278817       10/1993
(Continued)

OTHER PUBLICATIONS

Non-Final Office Action and Examiner-Initiated Interview Summary dated Apr. 6, 2015 for corresponding U.S. Appl. No. 14/145,561, filed Dec. 31, 2013.
(Continued)

*Primary Examiner* — Octavian Rotaru

(57) ABSTRACT

The subject matter described herein includes methods, systems, and computer readable media for tracking consumer interactions with products using modular sensor units. In one system, a plurality of weight and motion sensors is configured to track consumer interactions with products. The system further includes a plurality of sensor mounts for holding the sensors in place. Each sensor mount includes signal lines for transmitting power to the sensors and for conducting signals between the sensors and a signal processor. The system further includes a plurality of conductors for interconnecting sensor mounts to a signal processor. The system further includes a plurality of connectors to allow rapid addition and removal of the sensors and their mounts as needed for a particular product planogram.

14 Claims, 8 Drawing Sheets

Related U.S. Application Data

(60) Provisional application No. 61/748,357, filed on Jan. 2, 2013, provisional application No. 61/453,942, filed on Mar. 17, 2011.

(56) References Cited

U.S. PATENT DOCUMENTS

| | | | |
|---|---|---|---|
| 4,819,015 A | | 4/1989 | Bullivant et al. |
| 4,925,038 A | | 5/1990 | Gajewski |
| 5,000,274 A | | 3/1991 | Bullivant |
| 5,376,948 A | * | 12/1994 | Roberts ............... G06F 3/0414 |
| | | | 345/156 |
| 5,450,971 A | | 9/1995 | Boron et al. |
| 5,549,373 A | | 8/1996 | Bustos |
| 5,645,182 A | | 7/1997 | Miller, Jr. et al. |
| 5,781,443 A | | 7/1998 | Street et al. |
| 6,034,334 A | * | 3/2000 | Nakamura ............ G01G 23/10 |
| | | | 177/185 |
| 6,142,375 A | * | 11/2000 | Belka .................... G06T 7/0008 |
| | | | 235/454 |
| 6,184,521 B1 | | 2/2001 | Coffin, IV et al. |
| 6,296,523 B1 | | 10/2001 | Sasai |
| 6,332,575 B1 | | 12/2001 | Schuessler et al. |
| 6,588,606 B2 | | 7/2003 | Miller, Jr. et al. |
| 6,688,478 B2 | | 2/2004 | Miller, Jr. et al. |
| 6,721,454 B1 | * | 4/2004 | Qian ................. G06F 17/30802 |
| | | | 382/103 |
| 6,752,277 B1 | | 6/2004 | Sempliner |
| 6,877,618 B2 | | 4/2005 | Mason |
| 6,878,896 B2 | | 4/2005 | Braginsky et al. |
| 6,886,746 B1 | * | 5/2005 | Edwards .............. G07G 1/0054 |
| | | | 235/383 |
| 7,268,692 B1 | * | 9/2007 | Lieberman ............ B65G 1/137 |
| | | | 340/555 |
| 7,322,520 B2 | | 1/2008 | Warden et al. |
| 7,516,848 B1 | | 4/2009 | Shakes et al. |
| 7,561,717 B2 | | 7/2009 | Anderson |
| 7,584,016 B2 | | 9/2009 | Weaver |
| 7,693,757 B2 | | 4/2010 | Zimmerman |
| 7,994,914 B2 | | 8/2011 | Irmscher et al. |
| 8,025,187 B2 | | 9/2011 | Sottosanti, Jr. et al. |
| 8,651,288 B2 | | 2/2014 | Squitieri |
| 2002/0161651 A1 | | 10/2002 | Godsey et al. |
| 2003/0001223 A1 | | 1/2003 | Gremm |
| 2003/0024982 A1 | * | 2/2003 | Bellis, Jr. ................. A47F 9/047 |
| | | | 235/383 |
| 2003/0038099 A1 | | 2/2003 | Bauman et al. |
| 2004/0098298 A1 | | 5/2004 | Yin |
| 2004/0254759 A1 | * | 12/2004 | Kubach .............. G01G 19/4144 |
| | | | 702/174 |
| 2005/0103850 A1 | | 5/2005 | Mergenthaler et al. |
| 2005/0131578 A1 | * | 6/2005 | Weaver .............. G01G 19/4144 |
| | | | 700/244 |
| 2005/0171854 A1 | | 8/2005 | Lyon |
| 2005/0177423 A1 | | 8/2005 | Swanson, Sr. |
| 2005/0270149 A1 | * | 12/2005 | Standing ............... G08B 21/22 |
| | | | 340/506 |
| 2005/0286220 A1 | | 12/2005 | Moore et al. |
| 2006/0071774 A1 | | 4/2006 | Brown et al. |
| 2006/0092042 A1 | | 5/2006 | Davis et al. |
| 2006/0216138 A1 | | 9/2006 | Schaefer |
| 2006/0238307 A1 | | 10/2006 | Bauer et al. |
| 2007/0050271 A1 | | 3/2007 | Ufford et al. |
| 2007/0067203 A1 | | 3/2007 | Gil et al. |
| 2007/0193971 A1 | | 8/2007 | Hardy et al. |
| 2007/0255665 A1 | * | 11/2007 | Oosugi ................... A47F 9/047 |
| | | | 705/414 |
| 2008/0082360 A1 | * | 4/2008 | Bailey .................... G06Q 10/06 |
| | | | 705/2 |
| 2008/0159634 A1 | | 7/2008 | Sharma et al. |
| 2008/0186167 A1 | | 8/2008 | Ramachandra |
| 2008/0186174 A1 | | 8/2008 | Alexis et al. |
| 2009/0085746 A1 | * | 4/2009 | Erickson .............. G06K 7/0008 |
| | | | 340/572.1 |
| 2009/0179753 A1 | | 7/2009 | Bonner et al. |
| 2009/0192921 A1 | | 7/2009 | Hicks |
| 2009/0207022 A1 | | 8/2009 | Reckeweg et al. |
| 2009/0233714 A1 | | 9/2009 | Toro |
| 2009/0294479 A1 | | 12/2009 | Sottosanti, Jr. et al. |
| 2010/0010868 A1 | | 1/2010 | Aimone Catti |
| 2010/0023300 A1 | | 1/2010 | Farry et al. |
| 2010/0065632 A1 | | 3/2010 | Babcock et al. |
| 2010/0139989 A1 | | 6/2010 | Atwater et al. |
| 2010/0327164 A1 | | 12/2010 | Costello et al. |
| 2011/0010275 A1 | | 1/2011 | Hull |
| 2012/0185590 A1 | | 7/2012 | Kolin et al. |
| 2012/0245969 A1 | | 9/2012 | Campbell |
| 2013/0117053 A2 | | 5/2013 | Campbell |
| 2014/0110584 A1 | | 4/2014 | Campbell |
| 2014/0114708 A1 | | 4/2014 | Campbell |
| 2014/0289009 A1 | | 9/2014 | Campbell |
| 2015/0184997 A1 | | 7/2015 | Campbell |

FOREIGN PATENT DOCUMENTS

| | | |
|---|---|---|
| JP | 09-288764 A | 11/1997 |
| JP | 2008-247558 A | 10/2008 |
| KR | 10-1998-0074218 A | 11/1998 |
| KR | 10-0935341 B1 | 1/2010 |
| WO | WO 2012/125960 A2 | 9/2012 |
| WO | 2014107462 A1 | 7/2014 |
| WO | WO 2014/107457 A1 | 7/2014 |

OTHER PUBLICATIONS

Non-Final Office Action dated Apr. 24, 2015 for corresponding U.S. Appl. No. 14/586,389, filed Dec. 30, 2014.

Final Office Action dated Jun. 24, 2015 from corresponding U.S. Appl. No. 13/422,736, filed Mar. 16, 2012.

Interview Summary dated Mar. 18, 2015 for corresponding U.S. Appl. No. 13/422,736, filed Mar. 16, 2012.

Notification of Transmittal of the International Search Report and the Written Opinion of the International Searching Authority, or the Declaration for International Application No. PCT/US2014/072776 (dated Mar. 12, 2015).

Commonly-assigned, co-pending U.S. Appl. No. 14/586,389 for "Methods, Systems, and Computer Readble Media for Tracking Human Interactions With Objects Using Modular Sensor Segments,"(Unpublisged, filed Dec. 30, 2014).

Non-Final Office Action for U.S. Appl. No. 13/422,736 (dated Dec. 2, 2014) .

First Examination Report for New Zealand Patent Application No. 614984 (Jul. 14, 2014).

Non-Final Office Action for U.S. Appl. No. 13/422,736 (dated Jul. 18, 2014).

Notification of Transmittal of the International Search Report and the Written Opinion of the International Searching Authority, or the Declaration for International Application No. PCT/US2013/078529 (dated Apr. 29, 2014).

Notification of Transmittal of the International Search Report and the Written Opinion of the International Searching Authority, or the Declaration for International Application No. PCT/US2013/078509 (dated Apr. 24, 2014).

Communication of European Publication Number and Information on the Application of Article 67(3) EPC for European Patent Application No. 12717507.3 (dated Jan. 15, 2014).

"Snackmaker Modernized the Impulse Buy with Sensors, Analytics," CIO Journal, The Wall Street Journal, pp. 1-3 (Oct. 11, 2013).

Notification of Transmittal of the the International Search Report and the Written Opinion of the International Searching Authority, or the Declaration for International Application No. PCT/US12/29518 (Sep. 21, 2012).

Final Office Action dated Jan. 29, 2016 for corresponding U.S. Appl. No. 14/145,561.

Non-Final Office Action dated Mar. 23, 2016 for U.S. Appl. No. 13/422,136.

Final Office Action dated Jan. 21, 2016 for U.S. Appl. No. 14/586,389.

(56) References Cited

OTHER PUBLICATIONS

Non-Final Office Action dated Apr. 28, 2016 for U.S. Appl. No. 14/586,389.
Non-Final Office Action dated Oct. 25, 2016 for U.S. Appl. No. 14/145,561.

* cited by examiner

METHODS, SYSTEMS, AND COMPUTER READABLE MEDIA FOR TRACKING CONSUMER INTERACTIONS WITH PRODUCTS USING MODULAR SENSOR UNITS

PRIORITY CLAIM

This application claims the benefit of U.S. Provisional Patent Application Ser. No. 61/748,357, filed Jan. 2, 2013, the disclosure of which is incorporated herein by reference in its entirety.

This application is a continuation-in-part of U.S. patent application Ser. No. 13/422,736, filed Mar. 16, 2012, which claims the benefit of U.S. Provisional Patent Application Ser. No. 61/453,942, filed Mar. 17, 2011, the disclosures of which are incorporated herein by reference in their entireties.

TECHNICAL FIELD

This disclosure relates to systems for tracking consumer interactions with retail products on merchandising fixtures in real time. In addition, the subject matter described herein relates to methods, systems, and computer readable media for tracking the passage of objects using modular sensor segments.

BACKGROUND

CPG manufacturers and retailers are increasingly interested in embedding sensor systems into real retail environments to study the interactions between shoppers, displays and products. The learnings from such studies yield valuable insights that can be applied to optimize product range, store layout, displays and the overall shopper experience.

A particularly useful sensor system includes pickup sensors measuring product pickups using weight sensors installed under each product facing in combination with motion sensors tracking the position and movement of shoppers in proximity to the installation.

The effective design of such a sensor system presents numerous practical challenges, including but not limited to how to analyze signals from weight sensors in order to identify true pickups vs. extraneous vibrations, how to identify and address anomalous store conditions that might lead to invalid data (for example, out of stocks, power failures, hardware failures, one or more sensors becoming blocked, excessive noise in sensors,), how to validate that a system has been installed and setup correctly, how to use the CTS to control and track the status of any powered merchandising devices being used in experiments (for example lighting, activated signage, audio loops, digital media screens), how to minimize vibration levels in the stand in order to reduce false positive readings, how to position motion sensors in order to most reliably and discretely detect position and motion of shoppers, how to maximize durability of motion sensors, how to capture supplemental video or still footage in response to conditions detected by the CTS, how to discretely and robustly conduct sensor signals to a data logger and how to facilitate addition or removal of sensors to a system to accommodate any desired planogram.

Therefore, a need exists to address the problems noted above and other problems previously experienced.

SUMMARY

The subject matter described herein includes methods, systems, and computer readable media for tracking consumer interactions with products using modular sensor units. In one system, a plurality of weight and motion sensors is configured to track consumer interactions with products. The system further includes a plurality of mounting devices for holding the sensors. Each mounting device includes signal lines for transmitting power to the sensors and for conducting signals to a signal processor. The system further includes a plurality of conductors for connecting each sensor mount to the signal processor connecting pickup. The system further includes a plurality of connectors to allow rapid addition and removal of the sensors as needed for a particular product planogram.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings of which.

DETAILED DESCRIPTION

This disclosure relates to systems for tracking consumer interactions with retail products on merchandising fixtures in real time. In addition, the subject matter described herein relates to methods, systems, and computer readable media for tracking the passage of objects using modular sensor units. One aspect of the subject matter described herein is a consumer tracking system (CTS), such as an on-shelf tracking (OST) system, that can track consumer activity with respect to individual retail product units from a retail carton, while the retail carton may be positioned on an array of sensors mounted on or in close proximity to a retail display shelf of a merchandising fixture. The CTS's various product sensors provide a way to determine when a consumer interacts with a retail product unit positioned on a retail shelf, a description of the interaction, and stores information about the interaction as an event in an event log for later retrieval and analysis. The retail product unit may be the smallest increment of retail product offered by a retailer for purchase (e.g., a single pack of Wrigley® Five Rain gum, 15 sticks). The retail carton, also referred to as a product container, may contain retail product units in a standard number and configuration (e.g., 10 ct box of Wrigley® Five Rain gum). Multiple retail cartons containing the same product may be grouped together into an inventory zone. The merchandising fixture may display retail products to consumers in an appealing fashion. Example merchandising fixtures include a checkout shelf, a peg hook, an aisle shelf, and a temporary cardboard display.

The system can be better understood with reference to the following drawings and description. The elements in the figures are not necessarily to scale, emphasis instead being placed upon illustrating the principles of the system. In the figures, like-referenced numerals designate corresponding parts throughout the different views.

Some embodiments may include a pattern matching system.

Figure 1:
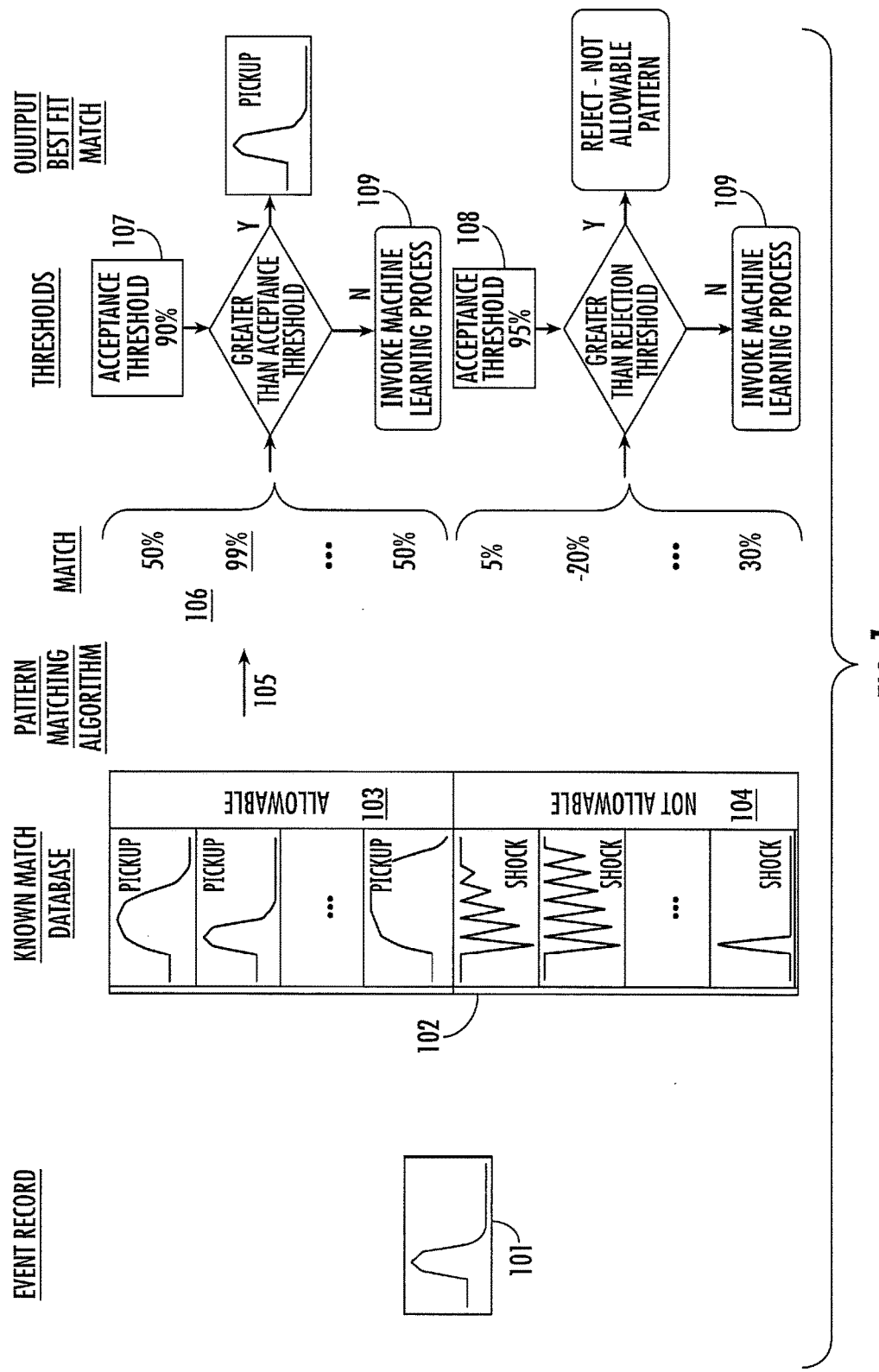
FIG. 1 is a flow diagram illustrating pattern matching to distinguish between pickup and shock or vibration events according to an embodiment of the subject matter described herein.

For example, shown in FIG. 1, to assist with classification of events comprising the following aspects of a method. A method 101 to store details of each sensor record over a period of time such as the logging system of an on-shelf tracking system. A pattern database 102 containing a set of allowable 103 and non-allowable 104 patterns identified from prior experience. A pattern matching algorithm 105 that may produce a percentage match between actual recorded events and each item within the database and thus identify the best match 106. A suitable matching algorithm may be a vector dot product, although it should be noted many others are possible. An acceptance threshold 107 (for example 90% match) applied to items where the best fit may be for an allowable pattern. A rejection threshold 108 (e.g., 95% match) applied to records where the best fit may be a non-allowable pattern. A machine learning system 109 may be invoked to classify any un-assignable events not meeting either threshold.

In FIG. 1, the patterns that may be compared by the pattern matching algorithm 105 include patterns related to a pickup-event, e.g., when the user has removed an article of merchandise from a carton. In the illustrated example, a pickup-event is indicated by a peak in the signal which results from the user pressing down on the article prior to removing the article followed by a period where the carton of articles weighs less than prior to the pickup-event, indicated by the lower signal level at the tail of each signal. Other signals that may be classified by pattern matching algorithm 105 include shock events, such as a vibration that occurs when the carton or shelf that holds articles is jolted.

Some embodiments may include a machine learning system to update the pattern database so as to progressively add new event patterns as they are discovered so as to reduce the number of un-assignable events over time.

Figure 2:
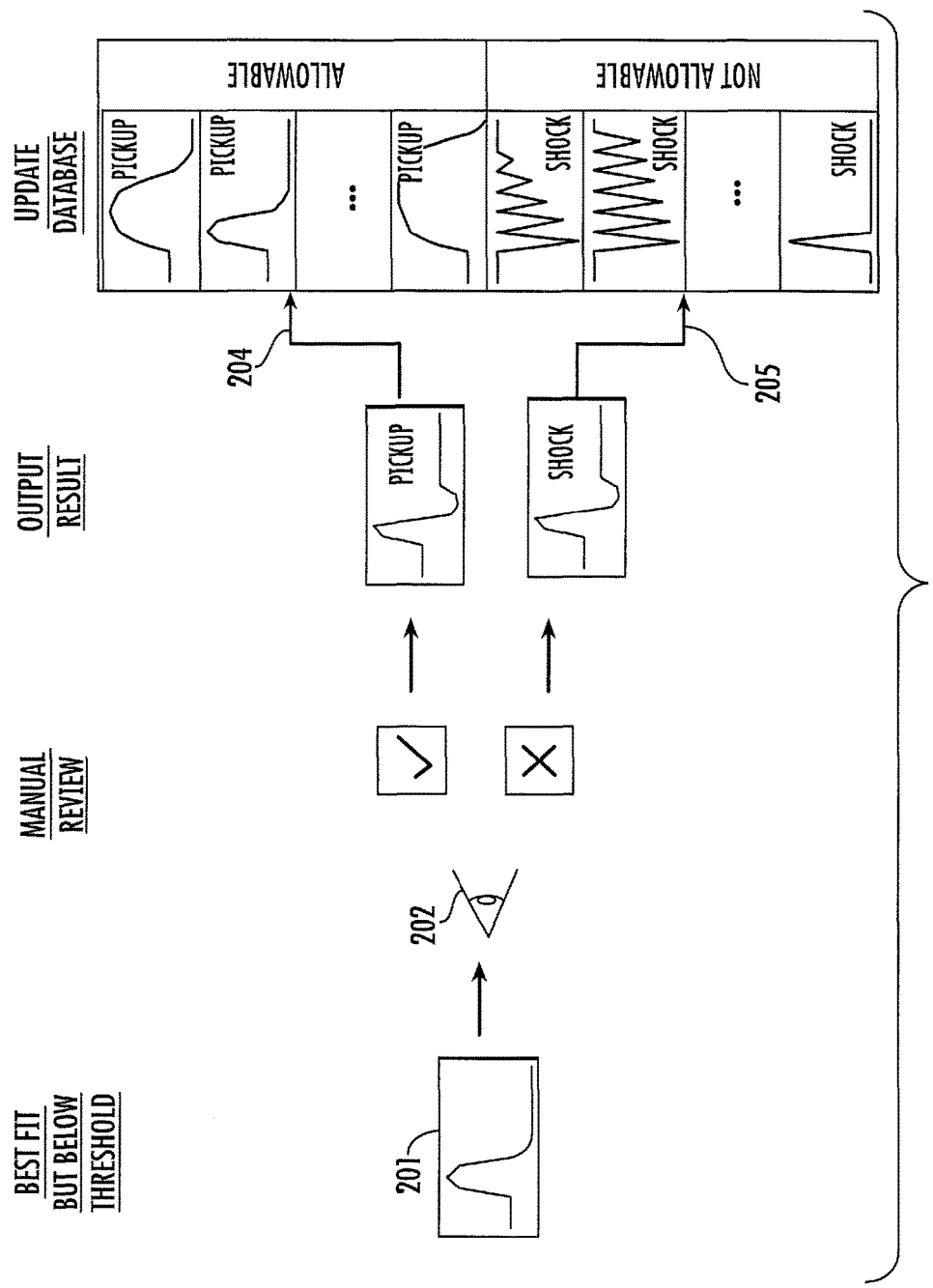
FIG. 2 is a flow diagram illustrating machine learning including classification and manual review of events as pickup or shock or vibration events according to an embodiment of the subject matter described herein.

FIG. 2 shows an example machine learning system. An event record 201 may be processed where the best fit for the event record did not previously meet an acceptance or rejection threshold. A human review may be conducted 202 that classifies the record into either an allowable or non-allowable form. The results of the review are recorded 203. The database may be updated 204 with the results of the review such that if the observed pattern is observed again in future it will be accurately diagnosed.

In the example illustrated in FIG. 2, the user trains the system to distinguish between pickup and shock events. For example, pattern 201 which represents a peak followed by a lower signal level than prior to the peak is most likely a pickup event. Accordingly, the user classifies the pattern as a pickup event and not a shock event. The results of the classification are stored in a pattern matching database.

Some embodiments may include an alarm system to alert the end user and store personnel to any anomalous conditions in store that may interfere with proper for example out of stocks, hardware failures, sensor blockages. Alerts may be produced real time, daily, or on any other time basis. Alerts may be provided either locally in the store, or remotely over a communications network. The alert system may include one or more features such as an alarm associated with a motion sensor obscured by object for longer than a configurable threshold (for example caused by an item discarded on counter by shopper). An alarm associated with excessive levels of noise on one or more sensors (for example caused by vibrations in the area of the merchandising unit). An alarm associated with an apparent malfunction of a sensor (for example loss of power, loss of sensitivity). An alarm associated with stock levels below a configurable threshold in one or more inventory zones.

Some embodiments may include a local video display at the store (for example a notebook or tablet PC) displaying current operational status of the CTS including history of recent events and any alarms. The screen may be repositionable to any convenient location around the merchandising unit so as to facilitate troubleshooting.

Some embodiments may include a remote alert system over a communications network transmitting alerts to the service personnel responsible for the maintenance of the system.

Some embodiments may include a local audible alarm in the store, either electronic or verbal, describing the nature of the alarm and requesting assistance. A visible alarm on front and rear of display, for example, in the form of warning lights or enunciator panels.

Some embodiments may include a setup mode to assist personnel with proper installation of new experimental setups including one or more features such as a restock button accessible from any location around the merchandising unit to toggle system into or out of setup mode. The features may also include: an enunciator system creating an obvious indicator (visual, audio or any other means) that system is in setup mode; a suspension of logging activity during setup mode; and/or creation of a setup event record indicating start and stop of setup. The features may also include: an automatic confirmation check that setup process has been properly completed (for example that all expected inventory zones are populated) and that system parameters are within acceptable tolerances; and/or an automatic setup termination system if system is left in setup mode for longer than an configurable time period.

Some embodiments may include a merchandising activation system to remotely switch on and off marketing devices. A merchandising activation system can comprise a number of features. The features may include one or more marketing devices in or near the store intended to attract shoppers' attention or persuade them to buy, for example, lighting, media displays, audio loops, coupon printers or any other device. Also, they may include an output from the CTS to control the marketing device; and/or an algorithm to change the state of the marketing device, either on a pre-assigned schedule (for example on for one hour, off for one hour), in response to a remote command or in response to in-store conditions (for example shopper activity within a configurable distance of the merchandising unit). If needed a relay or other device to switch the marketing device on or off, may modulate the power to the marketing device or in any other way change the state of the marketing device based on the CTS output. Also, creation of records in the CTS log registering the change in state of the marketing device.

Analytics to separate out the impact of the marketing device by comparing shopper behavior during periods of different levels of activity of the devices. Impacts may include many features. Such features may include increased or decreased levels of shopper conversion. Increased or decreased shopper visits to the merchandising unit. Increased or decreased shopper dwell time near the merchandising unit. And/or switching of shoppers from one product to another.

Some embodiments may include a vibration control system. It is noted that sensors operating on a weight principle may be susceptible to vibrations. Vibrations could be caused by for example placement of heavy merchandise on the checkout, registers opening and closing, or shoppers leaning on the counter. To reduce the possibility of false positive detections, vibration control measures can be deployed. For example, anti-vibration mounts installed under the merchandising unit. Such anti-vibration may include bubble wrap or precision engineered shock absorbing materials such as Sorbothane™, for example. Anti-vibration materials may be installed at the source of vibration, for example, on the counter or under the cash register.

Some embodiments will include motion and/or proximity sensors to measure presence and activity of shoppers close to the merchandising unit. Motion sensors may operate on ultrasonic, infrared, camera technology or any other measurement principle capable of measuring distance and motion on a non-contact basis.

Figure 3:
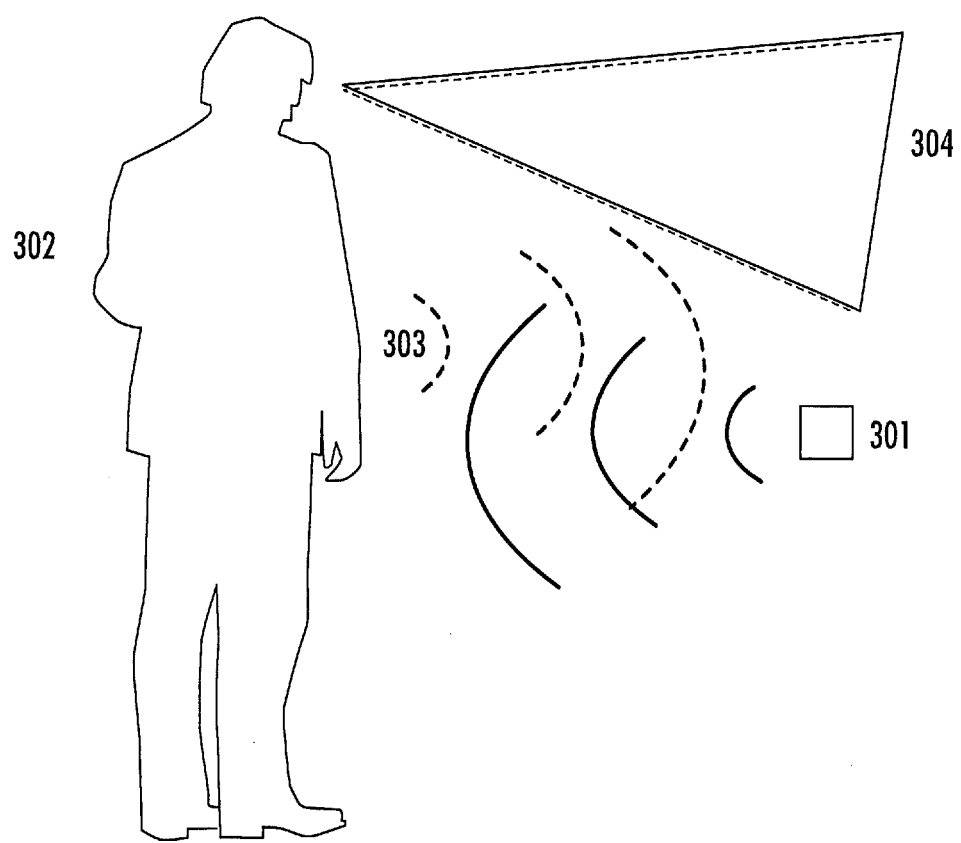
FIG. 3 is a schematic diagram illustrating a proximity and motion detection system according to an embodiment of the subject matter described herein.

In some embodiments motion sensors may be located at waist height. In FIG. 3 a motion sensor 301 is directed towards a shopper 302 and specifically waist height 303. In this way it is possible to maximize the probability of a reflected signal by targeting the largest physical cross section of a shopper while also remaining less intrusive than if placed at eye level 304 where shopper's attention is more likely to be attracted.

Figure 4:
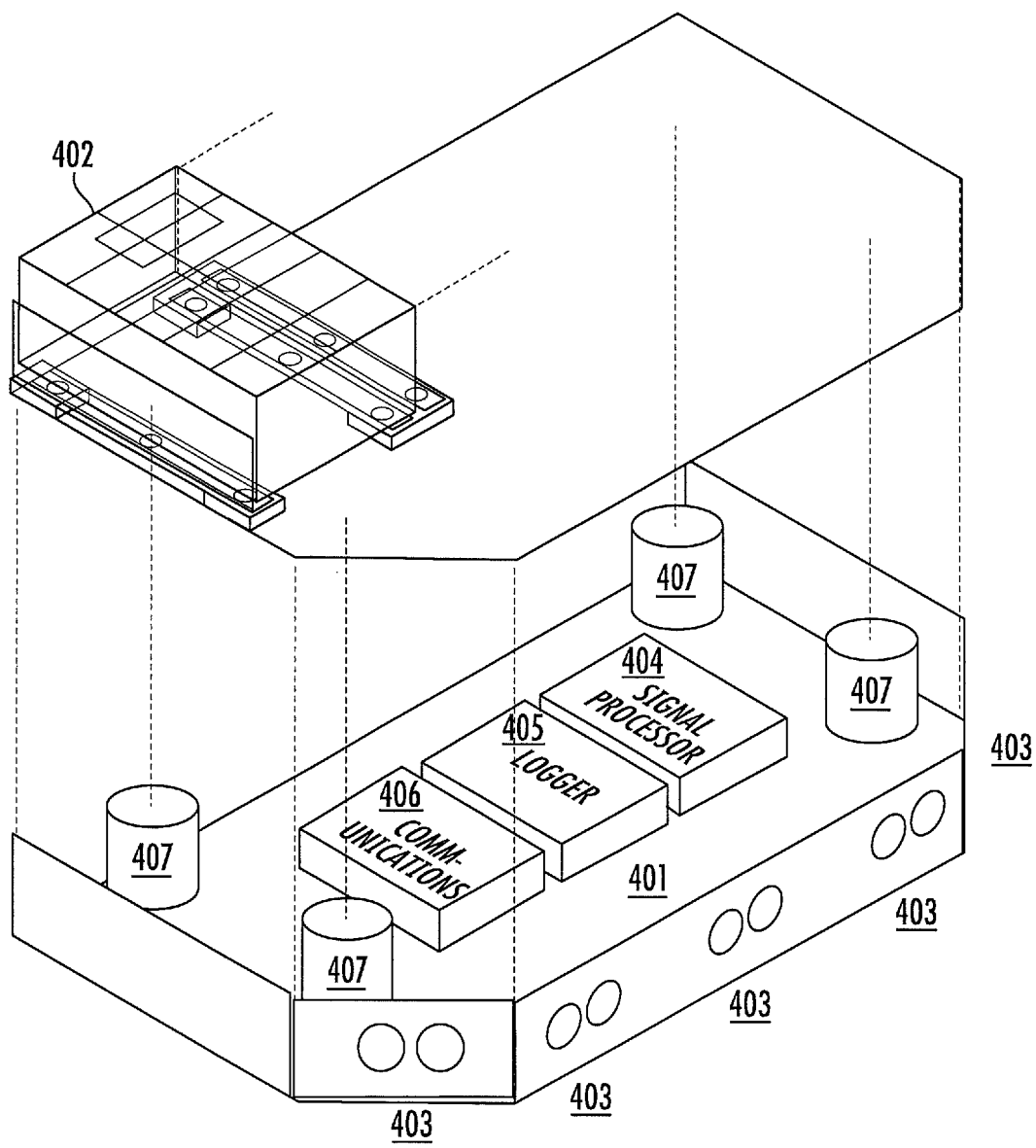
FIG. 4 is a schematic diagram illustrating an integrated motion mount according to an embodiment of the subject matter described herein.

Some embodiments may further include an integrated motion mount as shown in FIG. 4. A motion mounting structure 401 is installed underneath the merchandising area 402 and includes mounts for multiple motion sensors 403 with mounting hardware locking the motion sensors in a specific direction relative to the merchandising unit. The motion mount may also incorporate other system elements integrated into a single unit for tidiness and discreteness, including: signal processing hardware 404; logging hardware 405; communication hardware 406; and/or anti-vibration mounts 407.

Some embodiments may include measures to ensure durability of motion sensors. It is noted that the majority of commercially available ultrasonic sensors include transducers with a wire mesh front which may be vulnerable to handing by store personnel or shoppers. To mitigate this, one or more of the following measures may be employed. Ultrasonic probes with solid transducers resistant to mechanical damage. One or more redundant motion sensors in the event that primary sensors fail. Measures to reduce visibility of sensors to shoppers, for example embedding ultrasonic sensors flush within a flush facing of neutral colored material, for example matching color of shop counter.

Some embodiments may include a video capture system whereby a segment of video footage that may be captured in response to conditions detected by the CTS. Video may include the merchandising unit, the area surrounding it or any other view. Video may typically be temporarily collected for a recent window (for example last five minutes) and then at completion of an event on any of the sensors the video portion corresponding to the timeline of that measured event may be stored.

Some embodiments may include a signal transmission system. The signal transmission transmits signals and power between sensors and a data logging system. The signal transmission system may produce an optimal trade-off between the following criteria: transmit signals reliably with minimum noise; be rapidly configurable to any desired shelf configuration; withstand handling in the field by service personnel; and/or (d) be as invisible as possible to shoppers and store personnel.

Some embodiments may include wires concealed below product, either regular wires and/or flat flexible conductors.

Figure 5:
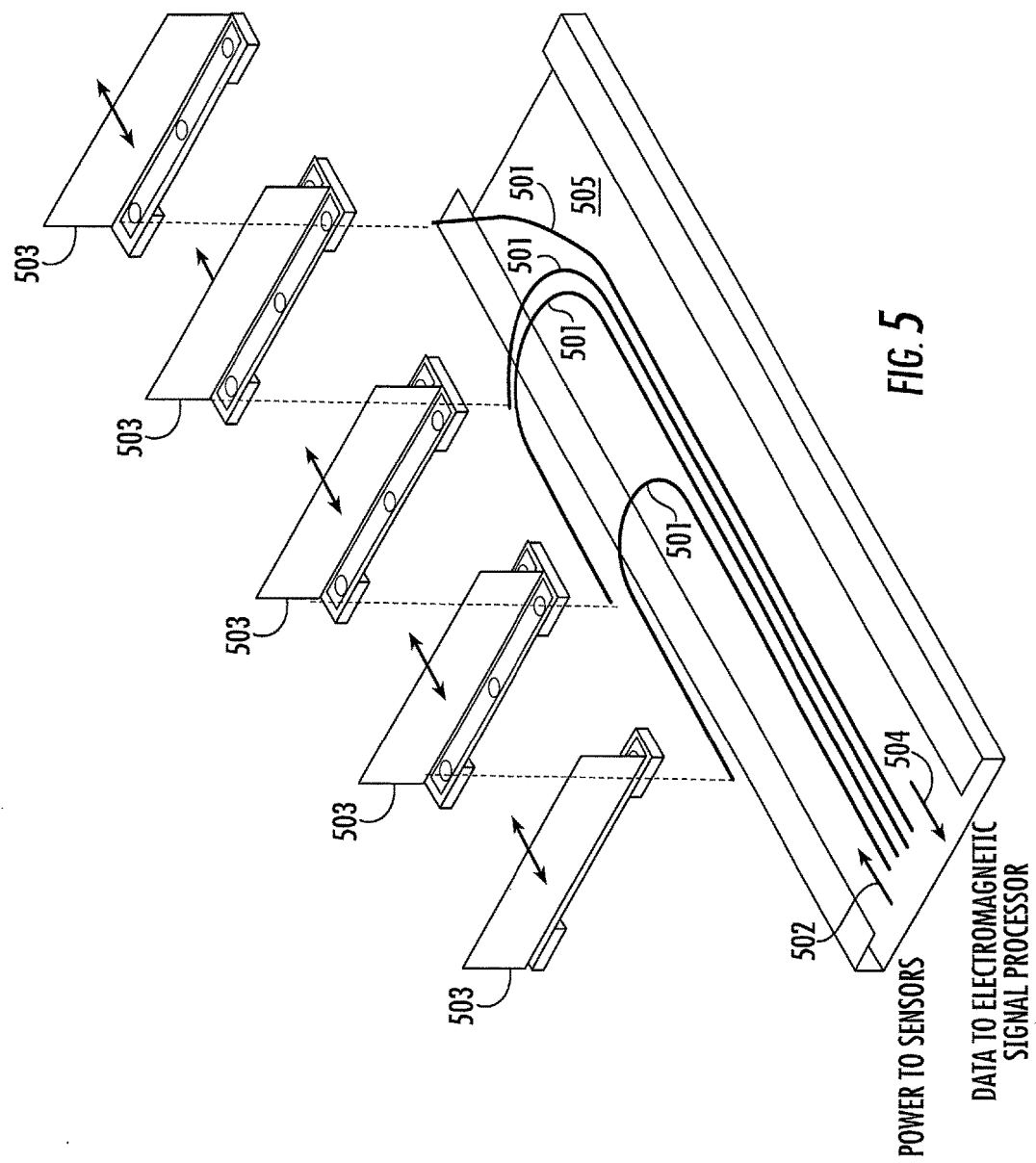
FIG. 5 is schematic diagram illustrating modular sensor units and signal transmission wires that conduct signals between the modular sensor units.

FIG. 5 shows an example system. In FIG. 5, multi-conductor wires 501 transmit power 502 to an array of mounted sensors 503 and also transmit sensor signals 504 to electromagnetic signal processor. The wires are supported by a tray 505 which also provides a support and sliding track for the mounted sensors 503.

In another embodiment electrical connection of sensors may be via electronic brushes onto a conductive track running beneath the sensors, so eliminating need for any wires on shelf.

Also, for example, daisy-chain connections may be between sensors where the only connections are made between sensors. Daisy chains may be constructed to allow either parallel connection of multiple sensors to the signal processor, or serial connection of a single sensor at a time.

Figure 6:
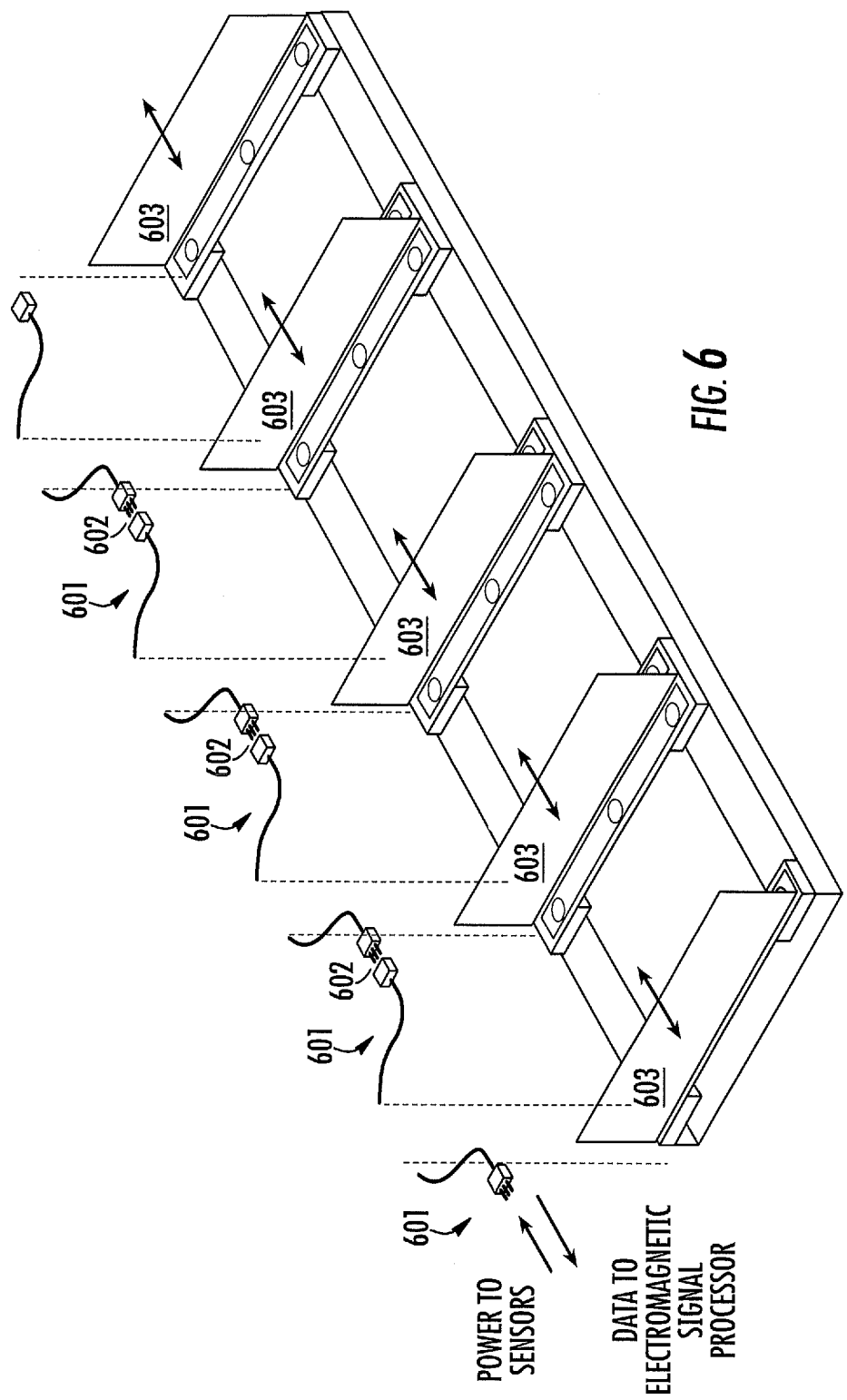
FIG. 6 is a schematic diagram illustrating modular sensor units and connectors between the modular sensor units where the sensor units are daisy-chained together according to an embodiment of the subject matter described herein.

FIG. 6 shows an example mechanical layout of a daisy chain system. Multi-conductor wires 601 transmit power to sensors 602 and sensor signals to an electromagnetic signal processor. The wires incorporate connectors 603 to allow the rapid addition and/or removal of sensors as needed to construct a particular planogram.

Figure 7:
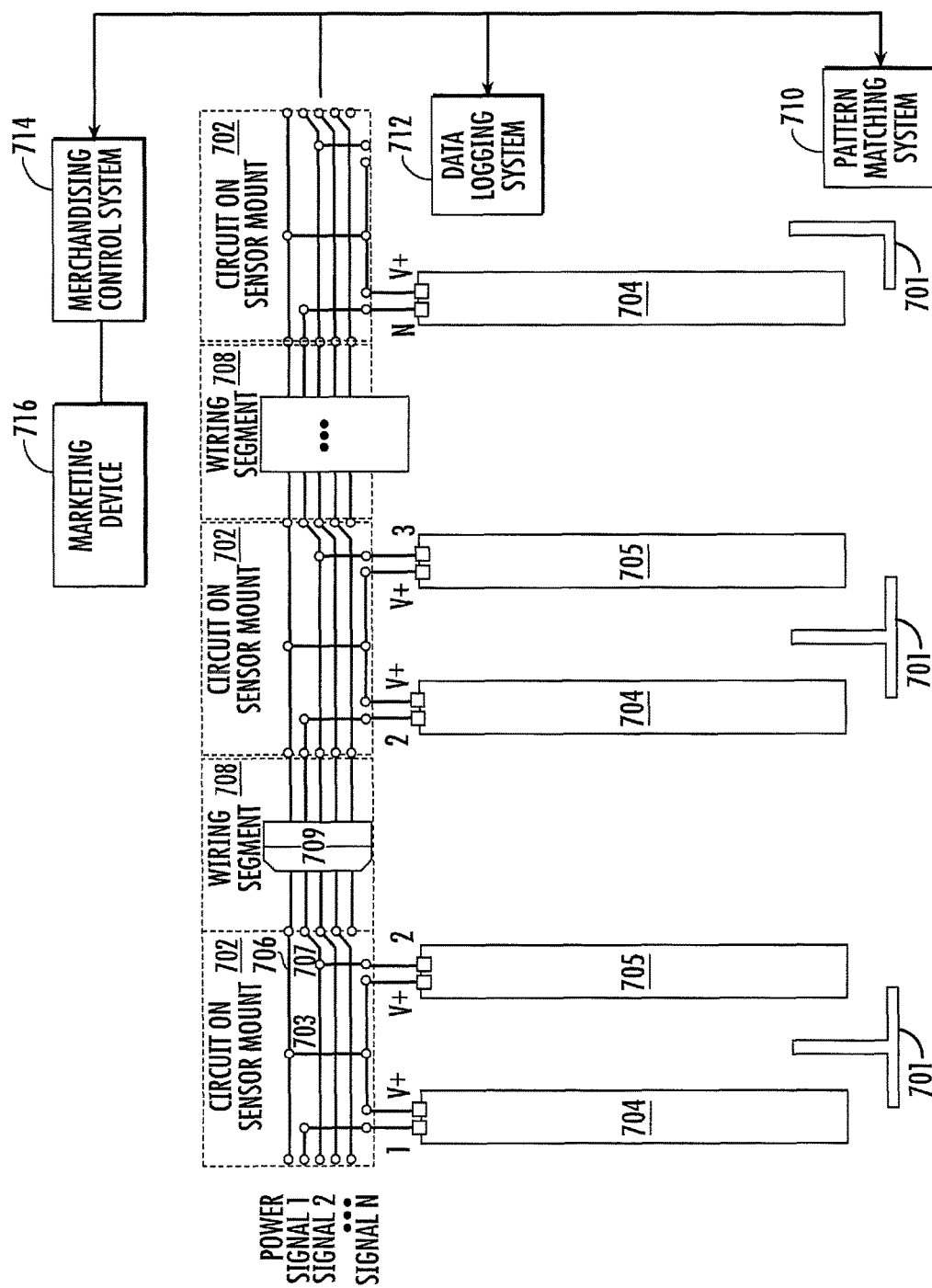
FIG. 7 is a schematic diagram illustrating connections between sensor units and output provided to various systems according to an embodiment of the subject matter described herein.

FIG. 7 shows an example electrical layout of a daisy chain system for a parallel connection of multiple sensors to a signal processor. Each sensor mount 701 incorporates an onboard circuit 702. That circuit may have the following functions: transmit power 703 to the sensors; connect relevant signals from a left hand sensor 704 and right hand sensor 705 to the appropriate signal lines; connect power to downstream locations in the daisy chain 706; and/or route signal lines 707 so that each downstream sensor connects to one higher ordinal signal lines than the prior. For example, allowing the following. Sensor M: Left hand sensor connected to signal line N, right hand sensor connected to signal line N+1. Sensor M+1: Left hand sensor connected to signal line N+1, right hand sensor connected to signal line N+2. Connect to upstream and downstream wiring segments 708 which may be joined by multi-conductor connectors 709.

With respect to wire connections using low profile locking connectors, it should be noted that without locking connectors, wires may be pulled loose or damaged during adjustment of sensor positions.

Some embodiments may include a signal communications protocol from shelf sections to the data logging system designed to operate on the least number of wires possible and allow daisy chaining of signals between shelf sections. To achieve this, analog signals may be converted to digital by means of a conversion device (for example a microcontroller or dedicated analog to digital converters). The conversion device may be configured to process signals from one or more shelves or a segment of shelf. Communications between shelf sections and a data logging device may then take place with a number of digital communications protocols for example $SP^1$ or $I^2C$ protocols.

Additionally or alternatively, a wireless signal transmission may be used to transmit signals from shelf sections to the logging device, by conserving power when no change is in progress it may be possible to operate with low power, for example, a local coin cell.

Figure 8:
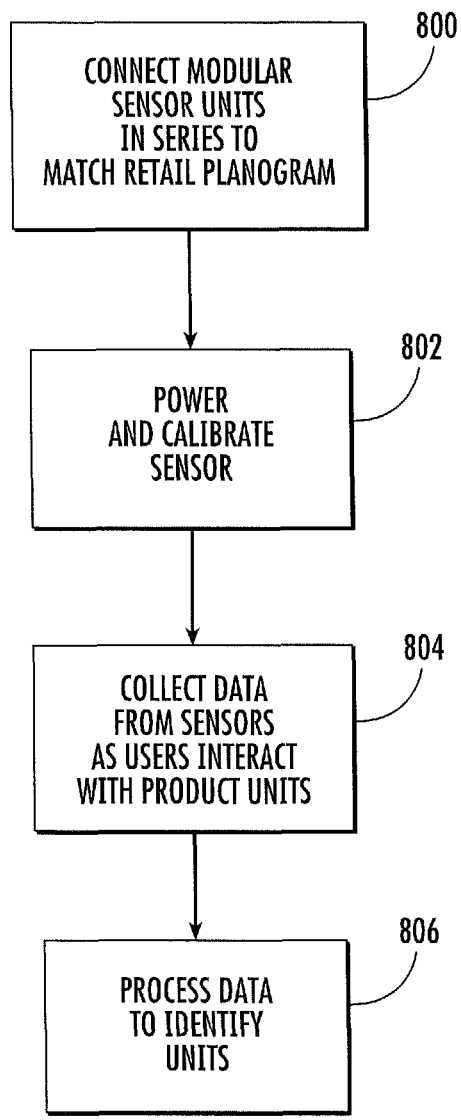
FIG. 8 is a flow chart illustrating an exemplary process for tracking user interactions with products using modular sensor units according to an embodiment of the subject matter described herein.

As stated above, the sensors may be connected to a pattern matching system 710 that identifies pickup and vibration events based on sensor output, a data logging system 712 that logs sensor data, and a merchandising control system 714 that controls a marketing device 716 based on sensor output. Merchandising control system 714 may also analyze the effects of different operation of marketing device 716 on consumer behavior. FIG. 8 is a flow chart illustrating an exemplary process for tracking consumer interaction with product units on a retail shelf according to an embodiment of the subject matter described herein. Referring to FIG. 8, in step 800, modular sensor units are connected in series to match a retail planogram. For example, pickup sensors and/or proximity sensors may be connected together across the front of a retail shelf or an array of retail shelves. In step 802, the sensors are powered and calibrated. For example, after installation, the installer may individually poll each sensor to make sure that the proper sensors are located in the proper locations and measure output in the absence of consumers. In step 804, data is collected from the sensors as the consumers interact with products. For example, data for pickup and vibration events may be collected. In step 806, the data is processed to identify the various events.

The above-disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

What is claimed is:

1. A system for tracking interactions with products, comprising:
   a merchandising unit;
   a plurality of sensors configured to detect signals that change over time in response to a plurality of product items being removed or returned from the merchandising unit;
   a daisy-chain system, for incremental electrical connection of the plurality of sensors to upstream and downstream wiring segments joined by multi-conductor wires transmitting power to the plurality of sensors;
   a database containing allowable and non-allowable patterns of the plurality of product items; and
   a signal processor connected to the daisy-chain system configured to:
   receive and log the signals detected by the plurality of sensors;
   communicate with the database containing the allowable and non-allowable patterns; and
   execute a pattern matching algorithm by:
      identifying a pickup event, of at least one of the product items, detected as a peak in at least one of the detected signals indicating that a shopper has pressed down on the at least one of the product items prior to removing the at least one of the product items, followed by a period, detected by a lower signal level at a tail of the at least one of the detected signals, when the at least one of the product items weighs less than prior to the pickup event,
      identifying a vibration event when the at least one of the product items is jolted,
      generating a percentage best pattern match using a plurality of identified pickup and vibrations events for the at least one of the product items within the database,
      applying an acceptance percentage threshold to the generated percentage best pattern match to classify the plurality of identified pickup events into an allowable pattern,
      applying a rejection percentage threshold to the generated percentage best pattern match to classify the vibrations events into a non-allowable pattern,
      identifying un-assignable events that do not meet the acceptance percentage threshold or the rejection percentage threshold, and
      determining from the acceptance percentage threshold, the rejection percentage threshold, and newly discovered patterns, valid signals produced by the plurality of identified pickup events of the at least one of the product items and invalid signals produced by the vibrations events, and
      upon determination of the valid signals further identifying a position and an associated facing of the at least one of the product items that was identified as being removed or returned from the merchandising unit.

2. The system of claim 1, wherein the percentage best pattern match is derived according to a vector dot product.

3. The system of claim 1, wherein the acceptance percentage threshold is used to confirm the pattern in a signal received by the signal processor as being one of the allowable patterns.

4. The system of claim 1, wherein the percentage best pattern match is at least partially implemented by a machine learning system.

5. The system of claim 1, wherein the signal processor is further configured to validate a predetermined positioning of the plurality of sensors.

6. The system of claim 1, further comprising an alarm system to alert an operator of the system to an anomalous condition that interferes with operation of the system, the alert including at least one of: an out of stock alert, a hardware failure alert, a power failure alert, or a sensor blockage alert.

7. The system of claim 1, wherein consumer interactions tracked by the system are used to control an operation of an output device including lighting, activated signage, an audio loop, or a digital media screen.

8. The system of claim 1, further comprising a video capture system configured to record still or video images in response to the signal processor classifying a received pattern as one of the allowable patterns.

9. The system of claim 1, wherein the plurality of sensors includes weight sensors.

10. The system of claim 9, further comprising a plurality of range sensors configured to track a position and motion of a person when the person is in proximity to the merchandising unit.

11. The system of claim 9, further comprising anti-vibration mounts under the merchandising unit to reduce an amount of non-allowable patterns and false readings.

12. The system of claim 9, further comprising a plurality of proximity sensors configured to track movement of people or the product items through an area of space, the plurality of proximity sensors being positioned at a predetermined height to the movement of the people or the product items.

13. The system of claim 12, wherein the predetermined height is an average waist height of a sampled group of people.

14. A method for tracking interactions with products, comprising:
   detecting, by a plurality of sensors, signals that change over time in response to a plurality of product items being removed or returned from a merchandising unit;
   incrementally connecting, by a daisy-chain system, the plurality of sensors to upstream and downstream wiring segments joined by multi-conductor wires transmitting power to the plurality of sensors;
   storing, by a database, allowable and non-allowable patterns of the plurality of product items;
   connecting a signal processor to the daisy-chain system;
   receiving and logging, by the signal processor, the detected signals by the plurality of sensors;
   transmitting, by the signal processor, the detected signals to the database containing the allowable and non-allowable patterns;
   executing a pattern matching algorithm by:
      identifying, by the signal processor, a pickup event, of at least one of the product items, detected as a peak in at least one of the detected signals indicating that a shopper has pressed down on the at least one of the product items prior to remove the at least one of the product items, followed by a period, detected by a lower signal level at a tail of the at least one of the detected signals, when the at least one of the product items weighs less than prior to the pickup event,
      identifying, by the signal processor, a vibration event when the at least one of the product items is jolted,
      generating, by the signal processor, a percentage best pattern match using a plurality of identified pickup and vibrations events for the at least one of the product items within the database,
      applying, by the signal processor, an acceptance percentage threshold to the generated percentage best pattern match to classify the plurality of identified pickup events into an allowable pattern,
      applying, by the signal processor, a rejection percentage threshold to the generated percentage best pattern match to classify the vibrations events into a non-allowable pattern,
      identifying, by the signal processor, un-assignable events that do not meet the acceptance percentage threshold or the rejection percentage threshold,
      determining, by the signal processor, from the acceptance percentage threshold, the rejection percentage threshold, and newly discovered patterns, valid signals produced by the plurality of identified pickup events of the at least one of the product items and invalid signals produced by the vibrations events; and
   upon determination of the valid signals further identifying, by the signal processor, a position and an associated facing of the at least one of the product items that was identified as being removed or returned from the merchandising unit.

* * * * *